United States Patent
Barel (10) Patent No.: US 10,234,996 B2
(45) Date of Patent: Mar. 19, 2019

(54) CAPACITIVE BASED DIGITIZER SENSOR

(71) Applicant: Microsoft Technology Licensing, LLC, Redmond, WA (US)

(72) Inventor: Eliyahu Barel, Beit-Aryeh (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 14/746,883

(22) Filed: Jun. 23, 2015

(65) Prior Publication Data

US 2015/0370373 A1    Dec. 24, 2015

Related U.S. Application Data

(60) Provisional application No. 62/015,577, filed on Jun. 23, 2014.

(51) Int. Cl.
    *G06F 3/044*    (2006.01)
    *G06F 3/041*    (2006.01)
    *G06F 3/047*    (2006.01)

(52) U.S. Cl.
    CPC .............. *G06F 3/044* (2013.01); *G06F 3/047* (2013.01); *G06F 3/0414* (2013.01); *G06F 3/0416* (2013.01); *G06F 2203/04106* (2013.01)

(58) Field of Classification Search
    CPC .............. G06F 3/014; G06F 3/017; G06F 3/02
    See application file for complete search history.

(56) References Cited

U.S. PATENT DOCUMENTS

| | | | |
|---|---|---|---|
| 3,624,619 A * | 11/1971 | Ambrosio | G06F 3/045 178/17 D |
| 6,002,389 A | 12/1999 | Kasser | |
| 6,690,156 B1 | 2/2004 | Weiner et al. | |
| 6,762,752 B2 | 7/2004 | Perski et al. | |
| 7,030,860 B1 * | 4/2006 | Hsu | G06F 3/044 178/18.06 |
| 7,292,229 B2 | 11/2007 | Morag et al. | |
| 7,372,455 B2 | 5/2008 | Perski et al. | |
| 2003/0117476 A1 * | 6/2003 | Cross | G06F 3/045 347/107 |
| 2010/0033354 A1 * | 2/2010 | Ejlersen | G06F 3/044 341/33 |
| 2010/0051356 A1 | 3/2010 | Stem et al. | |
| 2010/0123679 A1 | 5/2010 | Kim et al. | |
| 2010/0265205 A1 | 10/2010 | Park et al. | |

(Continued)

FOREIGN PATENT DOCUMENTS

| | | |
|---|---|---|
| EP | 2149838 | 2/2010 |
| WO | WO 2015/198208 | 12/2015 |

OTHER PUBLICATIONS

Communication Relating to the Results of the Partial International Search dated Sep. 16, 2015 From the International Searching Authority Re. Application No. PCT/IB2015/054679.

Communication Relating to the Results of the Partial International Search dated Jan. 15, 2016 From the International Authority Re. Application No. PCT/IB2015/054679.

Official Action dated Feb. 2, 2016 From the US Patent and Trademark Office Re. U.S. Appl. No. 13/960,914.

(Continued)

*Primary Examiner* — Olga V Merkoulova (57) ABSTRACT

A sensor includes a sensor layer patterned with conductive elements spread across the sensor layer and a resilient layer proximate to the sensor layer. The conductive elements are electrically isolated from one another. The sensor layer is configured for capacitive based sensing and to detect local compressions based on pressure applied to the resilient layer.

21 Claims, 5 Drawing Sheets

(56) References Cited

U.S. PATENT DOCUMENTS

| | | |
|---|---|---|
| 2010/0265212 A1 | 10/2010 | Sekiguchi et al. |
| 2011/0096025 A1 | 4/2011 | Slobodin et al. |
| 2011/0181548 A1 | 7/2011 | Sekiguchi |
| 2011/0267300 A1 | 11/2011 | Serban et al. |
| 2011/0273394 A1 | 11/2011 | Young et al. |
| 2012/0001866 A1* | 1/2012 | Rapakko .............. G06F 3/044 345/174 |
| 2012/0038583 A1* | 2/2012 | Westhues ............ G06F 3/0412 345/174 |
| 2012/0075243 A1 | 3/2012 | Doi et al. |
| 2012/0086666 A1 | 4/2012 | Badaye et al. |
| 2012/0098783 A1 | 4/2012 | Badaye et al. |
| 2012/0098788 A1 | 4/2012 | Sekiguchi |
| 2012/0113054 A1* | 5/2012 | Hashimoto ........... G06F 3/0414 345/174 |
| 2013/0215035 A1 | 8/2013 | Guard |
| 2013/0229350 A1 | 9/2013 | Shaw et al. |
| 2013/0234734 A1 | 9/2013 | Iida et al. |
| 2013/0271161 A1 | 10/2013 | Solven et al. |
| 2014/0043289 A1* | 2/2014 | Stern ...................... G06F 3/044 345/174 |
| 2015/0198208 A1 | 7/2015 | Mellberg |

OTHER PUBLICATIONS

International Search Report and the Written Opinion dated Mar. 23, 2016 From the International Searching Authority Re. Application No. PCT/IB2015/054679.

Official Action dated Aug. 6, 2015 From the US Patent and Trademark Office Re. U.S. Appl. No. 13/960,914.

Restriction Official Action dated Apr. 29, 2015 From the US Patent and Trademark Office Re. U.S. Appl. No. 13/960,914.

International Search Report and the Written Opinion dated Nov. 24, 2015 From the International Searching Authority Re. Application No. PCT/182015/054679.

Invitation to Pay Additional Fees dated Oct. 10, 2016 From the International Preliminary Examining Authority Re. Application No. PCT/IB2015/054679.

International Preliminary Report on Patentability dated Dec. 8, 2016 From the International Preliminary Examining Authority Re. Application No. PCT/IB2015/054679. (12 Pages).

Written Opinion dated Jun. 30, 2016 From the International Preliminary Examining Authority Re. Application No. PCT/IB2015/054679. (10 Pages).

"Office Action Issued in European Patent Application No. 15739014.7", dated Sep. 18, 2018, 8 Pages.

* cited by examiner

CAPACITIVE BASED DIGITIZER SENSOR

RELATED APPLICATION

This application claims the benefit of priority under 35 USC § 119(e) of U.S. Provisional Patent Application No. 62/015,577 filed on Jun. 23, 2014, the contents of which are incorporated herein by reference in their entirety.

BACKGROUND

Digitizer systems that include capacitive based sensors are used as input devices for a variety of Human Interface Devices (HIDs) and for a variety of different applications. A touch-screen is one type of digitizer system that is integrated with a Flat Panel Display (FPD). Touch-screens are used for operating portable devices, such as laptop computers, tablet computers, MP3 players, smart phones and other devices.

Digitizer systems track free style input provided with a finger and/or stylus. A mutual capacitive sensor is one type of capacitive sensor for a digitizer system. Mutual capacitive sensors typically include a matrix formed with parallel conductive material arranged in rows and columns with a capacitive connection created around overlap and/or junction areas formed between rows and columns Bringing a finger or conductive object close to the surface of the sensor changes the local electrostatic field and reduces the mutual capacitance between junction areas in the vicinity of the finger or conductive stylus. The capacitance change at junction points on the grid can be detected to determine location of the finger or conductive object on the capacitive sensor. The capacitance change is determined by applying a signal along one axis of the matrix and measuring the signal in the other axis. Mutual capacitance allows multi-touch operation where multiple fingers, palms or styli can be tracked at the same time.

SUMMARY

According to an aspect of some embodiments of the present disclosure there is provided a capacitive based digitizer sensor that senses both position and applied pressure of an interacting object. According to an aspect of some embodiments of the present disclosure, the capacitive based digitizer sensor is adapted for use in the rain and/or underwater. According to an aspect of some embodiments of the present disclosure there is provided a digitizer system that is operated to use sensed pressure profiles to detect position of the interacting object. Optionally, pressure profiles are used for sensing interacting objects that are not conductive and/or for sensing interacting objects while a sensing surface of the digitizer sensor is wet.

Unless otherwise defined, all technical and/or scientific terms used herein have the same meaning as commonly understood by one of ordinary skill in the art. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWING(S)

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

A digitizing system may include a transparent digitizer sensor overlaid on display, e.g. a Flat Panel Display (FPD) and/or Liquid Crystal Display (LCD). The transparent digitizing sensor includes a matrix of vertical and horizontal conductive lines for sensing location of one or more of a stylus and/or a finger. Input to the digitizer sensor includes one or more of ElectroMagnetic (EM) transmission from the stylus touching the sensing surface, and capacitive coupling due to a conductive object such as a finger touching the screen. Location of a finger is detected by triggering one conductive line at a time along one axis of the grid and detecting output in response to each signal applied from a plurality of conductive lines along the other axis. The digitizing system is capable of detecting position of simultaneous occurrences of multiple styluses and/or multiple finger touches.

A pressure sensitive capacitive sensor may include an interaction surface over which a user interacts, a sensing layer, and a resilient layer that can be locally compressed responsive to local pressure applied on the interaction surface during user interaction with the capacitive sensor. The sensing layer and resilient layer extend across the interaction surface. The resilient layer can be positioned between two sensing layers of the capacitive sensor or between a sensing layer of the capacitive sensor and flat panel display over which the capacitive sensor is positioned. The capacitive sensor is used for both identifying an interaction point and determining pressure applied at the interaction point.

According to some embodiments of the present disclosure, a capacitive sensor includes and/or is integrated with a resilient layer positioned over the sensor and is operated as the interaction surface. According to some embodiments of the present disclosure, a capacitive sensor includes a resilient layer and/or air gap between two sensing layers of the sensor, e.g. a row sensing layer and a column sensing layers, between a sensing layer and a display, e.g. LCD or ground layer, between a conductive layer and a sensing layer or between a glass cover and a sensing layer. According to some embodiments of the present disclosure, the resilient layer provides for increasing proximity between an interacting object and a sensing layer, increasing proximity between a sensing layer and a grounded layer and/or increasing proximity between two sensing layers at a location of touch due to applied pressure.

In some exemplary embodiments, the resilient layer is formed from a compressible material, e.g. silicon, glue, organic gel and/or from spacer dots. Optionally, a material with a hardness of 20-40 durometer Shore A is used. Optionally, the sensor is patterned on a glass or PolyEthylene Terephthalate (PET) film substrate. Optionally, when spacer dots are used between sensing layers, pressure applied by an interacting object can lead to a local short connection between sensing layers that can be detected. Optionally, the resilient layer is 50-500 µm thick.

According to some embodiments of the present disclosure, the resilient layer is compressed locally in response to pressure applied by an interacting object. In some exemplary embodiments, local compression of the resilient layer enhances the measured capacitive effect of the interacting object. In some exemplary embodiments, integration of the resilient layer makes the sensor pressure sensitive and position of, as well as pressure applied by, the interacting object is detected. Optionally, a pressure profile detected with the sensor is used for tracking position of the interacting object.

According to some embodiments of the present disclosure, the capacitive sensor is configured for sensing interaction of an object, e.g., a conductive or non-conductive object, while a sensing surface of the capacitive sensor is wet and/or is underwater. Typically, the presence of water on a sensing surface of a capacitive to based sensor disrupts sensing and/or tracking of a finger and/or conductive object. Typically, the capacitive based sensors are not operable in underwater conditions.

Typically, contact with a body of water that is grounded, grounds the entire sensor and thereby desensitizes the sensor to fingertip touch. Drops of water on the sensing surface can typically be sensed by a capacitive sensor and may be mistakenly identified as an intended interaction with the sensor. In some exemplary embodiments, the sensor is also configured for sensing interaction of a non-conductive object, e.g. a fingertip covered with a glove, a plastic pointer and passive pen that may not transmit an electrostatic signal or otherwise influence the electromagnetic field of a digitizer.

Figure 1:
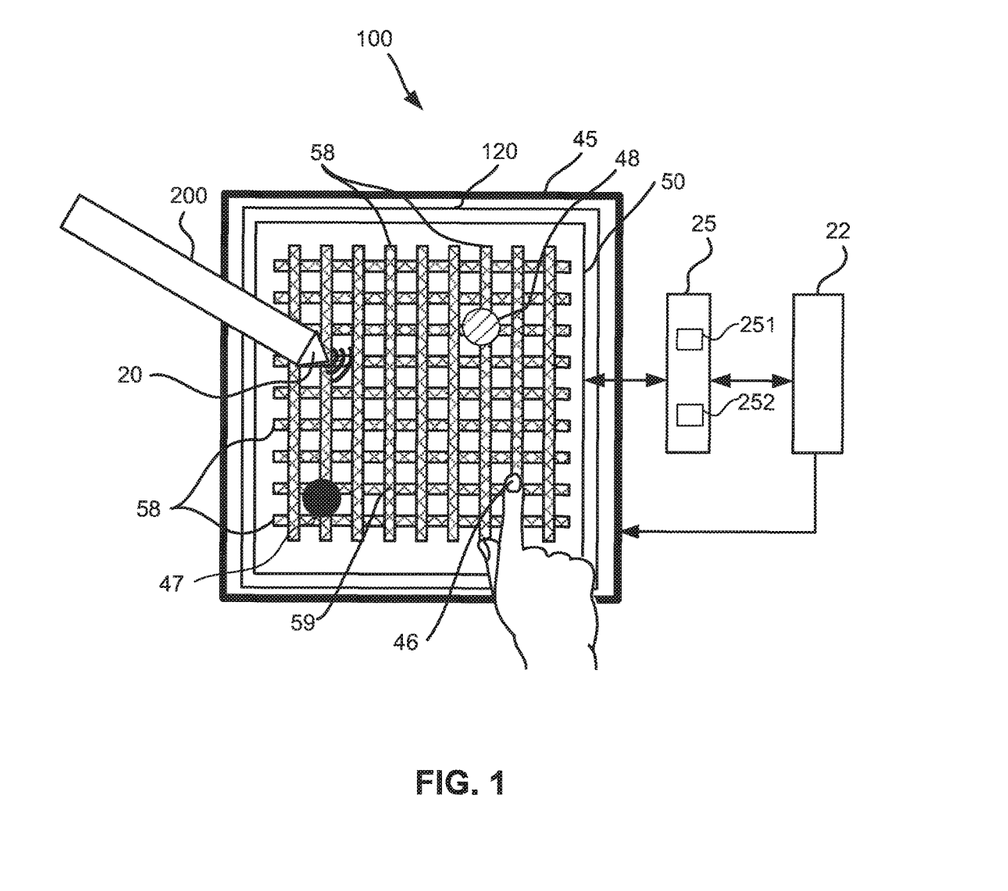
FIG. 1 is a simplified exemplary block diagram of an exemplary digitizer system of a touch enabled device in accordance with some embodiments of the present disclosure.

Reference is now made to FIG. 1 showing a simplified exemplary block diagram of an exemplary digitizer system of a touch enabled device in accordance with some embodiments of the present disclosure. According to some embodiments of the present disclosure, a computing device 100 includes a display 45 that is integrated with a digitizer sensor 50. In some exemplary embodiments, digitizer sensor 50 is a grid based capacitive sensor formed with row and column conductive strips 58. Typically, conductive strips 58 are electrically insulated from one another and each of conductive strips is connected at least on one end to digitizer circuitry 25. Typically, conductive strips 58 are arranged to enhance capacitive coupling between row and column conductive lines, e.g. around junctions 59 formed between rows and columns in response to presence of a conductive object.

According to some embodiments of the present disclosure, conductive strips 58 are operative to detect input by stylus 200 transmitting an electromagnetic signal and/or touch of one or more fingertips 46 or other conductive objects. Optionally, conductive strips are operative to detect pressure applied by conductive and non-conductive object.

Optionally, a mutual capacitance detection method and/or a self-capacitance detection method are applied with sensor 50 for sensing interaction with fingertip 46. Typically, during mutual capacitance and self-capacitance detection, digitizer circuitry 25 sends a triggering pulse and/or interrogation signal to one or more conductive strips 58 of digitizer sensor 50 and samples output from other conductive strips 58 in response to the triggering and/or interrogation.

Typically, the sampled output is the interrogation signal that crossed at to junctions 59 between row and column conductive strips 58 due to mutual capacitance formed around junctions 59. Base-line amplitude may be detected in the absence of any objects interacting with sensor 50. The presence of fingertip 46 decreases the amplitude of the coupled signal by about 5-30%. The presence of fingertip 46 produces a peak shaped location profile, e.g. a negative peak and/or a trough with a base that generally covers and may extend around a contact area of fingertip 46 on sensor 50. When fingertip 46 hovers over sensor 50, the location profile obtained is typically lower as compared to location profile obtained during touch. Typically, the presence of a token 47, e.g. a metal object that is floating and/or has a high impedance to ground, increases amplitude of the coupled signal by 5-10%. Optionally, objects formed with dielectric material are also detected with sensor 50. Typically, presence of objects formed with dielectric material increases amplitude of the coupled signal by 1-5%.

In some embodiments, some or all of conductive strips 58 along one axis of sensor 50 are interrogated simultaneously or in a consecutive manner, and in response to each interrogation, outputs from conductive strips 58 on the other axis are sampled. This scanning procedure provides for obtaining output associated with each junction 59 of the grid based sensor 50. Typically, this procedure provides for detecting coordinates one or more conductive objects, e.g. fingertip 46 touching and/or hovering over sensor 50 at the same time (multi-touch).

In some exemplary embodiments, sensor 50 is integrated with a resilient layer 120 to provide pressure sensing capability. In some exemplary embodiments, pressure sensing capability is provided when an air gap is established between sensor 50 and display 45 or between sensor 50 and a protective cover over which a user interacts, e.g. with finger 46, stylus 200 and/or token 47. According to some embodiments of the present disclosure, sensor 50 is operated to sense location of conductive objects, e.g. stylus 200 finger 46 and/or token 47 and detect pressure applied by an interacting object, e.g. conductive or non-conductive object 48. According to some embodiments of the present disclosure, both location and pressure are sensed based on output from conductive strips 58. According to some embodiments of the present disclosure, pressure sensed with sensor 50 is applied to detect coordinates of non-conductive object 48 interacting with sensor 50 and/or to detect coordinates of an object, e.g. conductive or non-conductive object interacting to with sensor 50 while an interacting surface of sensor 50 is immersed in water and/or includes drops of water. According to some embodiments of the present disclosure, digitizer circuitry 25 includes dedicated location detection circuitry 251 and dedicated pressure detection circuitry for detecting location and/or pressure from data sampled from sensor 50.

Typically, output from digitizer circuitry 25 is reported to host 22. Typically, the output provided by digitizer circuitry 25 may include coordinates of writing tip 20 of stylus 200, information transmitted by stylus 200, coordinates of one or more fingertips 46, coordinates of one or more tokens 47, pressure applied by stylus tip 20, fingertip 46, tokens 47 and/or pressure applied by non-conductive object 48. Typically, digitizer circuitry 25 uses both analog and digital processing to process signals detected with digitizer sensor 50. Optionally, some and/or all of the functionalities of dedicated circuitry 251 and 252 are integrated in one or more processing units adapted for controlling operation of digitizer sensor 50. Optionally, some and/or all of the functionalities of digitizer circuitry 25, dedicated circuitry 251 and 252 are integrated and/or included in host 22.

Figure 2:
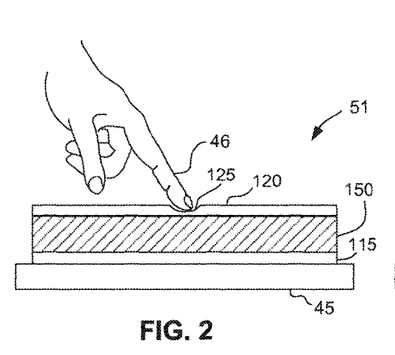
FIG. 2 is a simplified exemplary schematic drawing showing interaction with a capacitive sensor with a resilient interacting surface in accordance with some embodiments of the present disclosure.

Reference is now made to FIG. 2 that is a simplified exemplary schematic drawing showing interaction with a capacitive sensor including a resilient interacting surface in accordance with some embodiments of the present disclosure. According to some embodiments of the present disclosure, a sensor 51 includes a sensing layer 150 overlaid on a display 45 and covered with a resilient layer 120. Typically, sensor 51 is similar to sensor 50 and includes a pattern of conductive strips 58 on sensing layer 150 that provide for performing capacitive detection, e.g. mutual and/or self capacitance detection. Optionally, sensing layer 150 is secured onto display 45 with a layer of glue 115. In some exemplary embodiments, sensing layer 150 is a glass substrate or other rigid substrate. Optionally, sensing layer is 0.1 to 3 mm thick, e.g. 0.7 mm thick. Conductive strips 58 may be patterned on one or more surfaces of the glass substrate. Optionally, conductive strips 58 of sensing layer 150 are patterned on a surface facing display 45. Optionally conductive strips 58 of sensing layer 150 are patterned on a surface facing resilient layer 120. Alternatively, in some exemplary embodiments, sensing layer 150 is replaced by a flexible sensing layer that includes one or more layers of PET foil that are patterned with conductive strips 58.

According to some embodiments of the present disclosure, resilient layer 120 to forms an interaction surface on which a user interacts with sensor 51 using a fingertip 46, a stylus or other object. Typically, resilient layer 120 covers and protects sensing layer 150. According to some embodiments of the present disclosure, resilient layer 120 locally compresses in response to applied pressure, e.g. pressure applied by fingertip 46. Typically, local compression of resilient layer 120 increases proximity of fingertip 46 to sensing layer 150 and thereby increases the capacitive influence of fingertip 46 on sensing layer 150. In some exemplary embodiments, resilient layer 120 is defined to be between 50-500 μm thick, e.g. 50-200 μm. In some exemplary embodiments, resilient layer 120 is formed from soft material, e.g. silicon or an organic gel of 20-40 durometer (shore A). Optionally, resilient layer 120 includes a hard coat film. Typically, the hard coat film is the interacting surface of sensor 51. Optionally, resilient layer 120 is formed with an array of spacer dots coated with the hard coat film. Optionally, spacer dots 170 are formed from a material have a hardness of between 20-40 durometers (Shore A). Optionally, diameter of the spacer dots 170 is 20-200 μm. Optionally spacer dots 170 are similar to those used for resistive type digitizer sensors.

In some exemplary embodiments, output provided by sensor 51 responsive to touch is more pronounced with applied pressure due to the increase in proximity Typically, the output is sensitive to the amount of pressure applied by fingertip 46. Typically, as a user applies increasing pressure, resilient layer 120 is further compressed, proximity to sensing layer 150 increases and the capacitive coupling with sensor layer 150 increases. Typically, signal drain of triggering signals applied to conductive strips 58 increases as proximity of fingertip 46 to sensing layer 150 increases.

According to some embodiments of the present disclosure, sensor 51 is adapted for us under water. Typically, an indent or well 125 is created when fingertip 46 presses against resilient layer 120. While sensor 51 is underwater, by well 125 typically fills with water and the additional concentration of water in indent 125 introduces a local capacitive effect with sensing layer 150 at location of well 125. In some exemplary embodiments, more than one interacting object, e.g. conductive and/or non-conductive can be detected and/or tracked when wells 125 are created and filled with water during interaction. Typically, volume and depth of indent 125 and therefore the capacitive effect increases with an increase in applied pressure.

Figure 3:
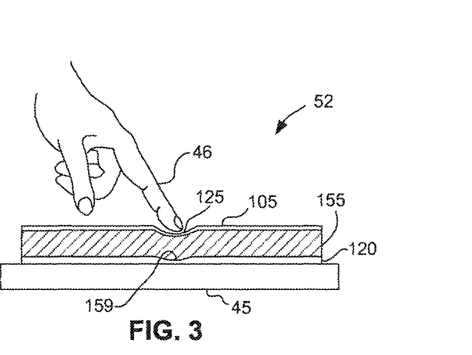
FIG. 3 is a simplified schematic drawing showing interaction with an exemplary flexible capacitive sensor including a resilient layer covering a surface of the sensor that overlays the display in accordance with some embodiments of the present disclosure.

Reference is now made to FIG. 3 that is a simplified schematic drawing showing interaction with an exemplary flexible capacitive sensor including a resilient layer covering a surface of the sensor that overlays the display in accordance with some embodiments of the present disclosure. According to some embodiments of the present disclosure, sensor 52 includes a flexible sensing layer 155, resilient layer 120 positioned between display 45 and sensing layer 155 and a protective cover 105. Typically, sensor 52 is similar to sensor 50 and includes a pattern of conductive strips 58 on sensing layer 155 that provide for performing capacitive detection, e.g. mutual and/or self capacitance detection. Optionally, flexible sensing layer 155 is formed from one or more layers of PET foil. Optionally, when more than one layer of PET foil is used, one layer of PET foil includes row conductive strips and another layer of PET foil includes column conductive strips.

According to some embodiments of the present disclosure, protective cover 105, sensing layer 155 and resilient layer 120 deform when pressure is applied by a user, e.g. with a fingertip 46. According to some embodiments of the present disclosure, resilient layer 120 locally compresses in an area of interaction 159 and area 159 of sensing layer 155 approaches display 45. Typically, display 45 acts as ground and/or is grounded.

According to some embodiments of the present disclosure, an approach of area 159 toward display 45 leads to a drain of the coupled signals in area 159 during capacitive detection. Typically, when fingertip 46 is interacting with sensor 52, this drainage is in addition to a signal drain due to a presence of fingertip 46. Optionally, in underwater conditions, drainage is in addition to a signal drain due to the presence of water in well 125. Typically, the local drainage of the signal due to the local proximity of display 45 further decreases the amplitude of coupled signals in area 159, e.g. the touched area. Typically, the drainage is sensitive to distance between sensing layer 155 and display 45 and increases as the proximity between area 159 and display 45 increases. Typically, this increase can be detected from the sampled output. According to some embodiments of the present disclosure, local drainage of the signal due to the local proximity of display 45 provides for detecting position of a non-conductive object and/or for detecting position while sensor 52 is immersed with water. Typically, amplitude of output detected is related to pressure applied by the non-conductive object.

Figure 4:
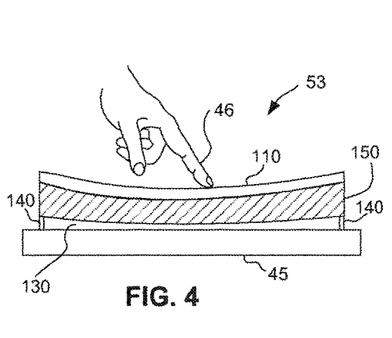
FIG. 4 is a simplified schematic drawing showing interaction with an exemplary capacitive sensor including spacers along edges of the sensor that provide an air gap between the sensor and the display in accordance with some embodiments of the present disclosure.

Reference is now made to FIG. 4 that is a simplified schematic drawing showing interaction with an exemplary capacitive sensor including spacers along edges of the sensor that provide an air gap between the sensor and the display in accordance with some embodiments of the present disclosure. According to some embodiments of the present disclosure, a sensor 53 includes sensing layer 150 mounted at a pre-defined height above display 45 with one or more spacers and/or a frame 140 and a protective cover 110. Optionally, the pre-defined height is 0.1-0.8 mm above display 45. In some exemplary embodiments, protective cover 110 is formed from glass or hard plastic and is typically rigid. Alternatively, cover 110 is replaced with a cover formed with resilient material that locally compresses in response to applied pressure with an interacting object.

According to some embodiments of the present disclosure, sensing layer 150 bends and/or bows in response to pressure applied by fingertip 46. In some exemplary embodiments, bowing of sensing layer 150 reduces a local volume of air between display 45 and sensing layer 150 toward and under an apex of the bowed sensing layer and reduces a dialectic constant between display 45 and sensing layer 150 near apex. Typically, capacitive coupling between sensing layer 150 and display 45 increases as air gap 130 decreases due to bowing of sensor layer 150. According to some embodiments of the present disclosure, the increase in capacitive coupling effects output detected on sensing layer 150 and is used to sense pressure applied by fingertip 46. According to some embodiments of the present disclosure, when fingertip 46 touches sensor 53 but does not apply pressure, the effect on the measured signal is localized around the touch area, and is due to the change in capacitance caused by the finger effect. However, when a finger touches the sensor and applies pressure, there is also a wide spread effect on the measured output due to bowing of sensing layer 150 that is superimposed on the local effect. This is described in more detail herein below in regard to FIGS. 8A-B.

In some exemplary embodiments, pressure applied by a non-conductive object can be detected using sensor 53. Optionally, location of a non-conductive object pressing on sensor 53 is detected with lower resolution as compared to detection that is achieved due to a presence of fingertip 46.

Figure 5:
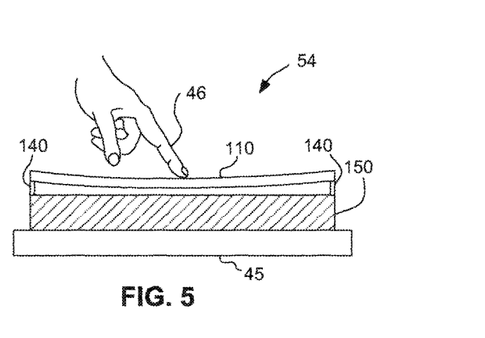
FIG. 5 is a simplified schematic drawing showing interaction with an to exemplary capacitive sensor including spacers along edges of the sensor that provide an air gap between a protective cover and the sensor in accordance with some embodiments of the present disclosure.

Reference is now made to FIG. 5 that is a simplified schematic drawing showing interaction with an exemplary capacitive sensor including spacers along edges of the sensor that provide an air gap between a protective cover and the sensor in accordance with some embodiments of the present disclosure. According to some exemplary embodiments of the present disclosure, sensor 54 includes an air gap 130 between a protective layer 110 formed from a rigid material and sensing layer 150. According to some embodiments of the present disclosure, capacitive coupling between fingertip 46 and sensing layer 150 at an interaction location increases as protective cover 110 approaches sensing layer 150.

In some exemplary embodiments, pressure applied by a non-conductive object can also be detected using sensor 54. Optionally, location of a non-conductive object pressing on sensor 54 is detected with lower resolution as compared to detection that is achieved due to a presence of fingertip 46.

Figure 6A:
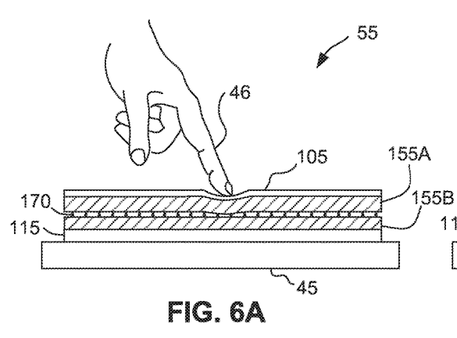
FIGS. 6A and 6B are simplified schematic drawings showing interaction with an exemplary capacitive sensor formed with two sensing layers separated by spacer dots in accordance with some embodiments of the present disclosure.
Figure 6B:
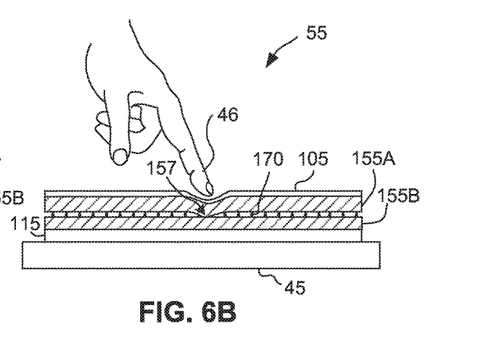

Reference is now made to FIGS. 6A and 6B that are simplified schematic drawings showing interaction with an exemplary capacitive sensor formed with two sensing layers separated by spacer dots in accordance with some embodiments of the present disclosure. According to some exemplary embodiments of the present disclosure, sensor 54 includes flexible sensing layer 155 formed from a first layer 155A and a second layer 155B separated by an array and/or grid of spacer dots 170. Typically, one of the layers includes the row conductive strips 58 and the other layer includes the column conductive strips 58. In some exemplary embodiments, spacer dots 170 are patterned on one of sensing layers 155. Typically, spacer dots 170 are formed from a resilient material. Optionally, spacer dots 170 are formed from a material have a hardness of between 20-40 durometers (Shore A). Optionally, diameter of the spacer dots 170 is 20-200 μm. Optionally spacer dots 170 are similar to those used for resistive type digitizer sensors. According to some embodiments of the present disclosure, sensor 55 additionally includes a protective layer 105 over which a user interacts with sensor 55.

According to some embodiments of the present disclosure, pressure applied by fingertip 46 locally decreases distance between sensing layer 155A and sensing layer 155B at a touch location. Decreasing distance between the layers typically increases the capacitive coupling between the layers and increases the amplitude of the coupled signal. Typically, the presence of fingertip 46 has the opposite effect of decreasing the amplitude of the coupled signal. According to some embodiments of the present disclosure, physical contact between layer 155A and layer 155B occurs above a pre-defined pressure. In some exemplary embodiments, when conductive strips are patterned on facing surfaces of layer 155A and layer 155B, physical contact 157 introduces a short at the touch location. Alternatively, when conductive strips are patterned on non-facing surfaces of layer 155A and layer 155B, proximity between the layers increases the capacitive coupling and layers are not shorted when contact is established. Typically, amplitude of the signal transmitted due to a short is same as amplitude of the applied triggering signal. According to some embodiments of the present disclosure, sensor 55 can be used for sensing both position and pressure applied by an interacting object that is not conductive. The amplitude of output in response to applied pressure will increase as the pressure increases. According to some embodiments of the present disclosure, sensor 55 can be used underwater and/or when a user is wearing gloves and also passive pen.

Figure 7:
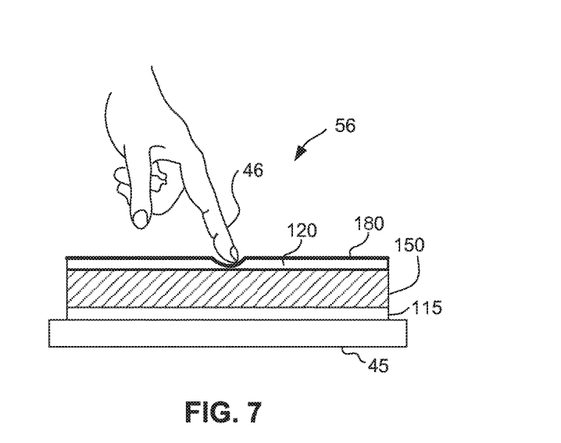
FIG. 7 is a simplified schematic drawing showing interaction with an exemplary capacitive sensor including a resilient interaction surface that is conductive in accordance with some embodiments of the present disclosure.

Reference is now made to FIG. 7 that is a simplified schematic drawing showing interaction with an exemplary capacitive sensor including a resilient interaction surface that is conductive in accordance with some embodiments of the present disclosure. According to some exemplary embodiments of the present disclosure, sensor 57 includes sensing layer 150 overlaid on display 45 and covered with a resilient layer 120 that provides the interacting surface over which fingertip 46 or other interacting object interacts. According to some exemplary embodiments of the present disclosure, resilient layer 120 is coated with conductive material 180. Typically, conductive material 180 is coated on the interacting surface. According to some exemplary embodiments of the present disclosure, a capacitive effect is achieved by locally pressing conductive material 180 toward sensing layer 150. In some exemplary embodiments, when conductive material 180 is floating and fingertip 46 presses against conductive material 180 during capacitive detection, the coupled signal is drained since fingertip 46 is grounded and amplitude of the coupled signal is decreased. Alternatively, pressure applied by a non-conductive object or non-grounded object during capacitive detection, increases amplitude of the coupled signal.

Figure 8A:
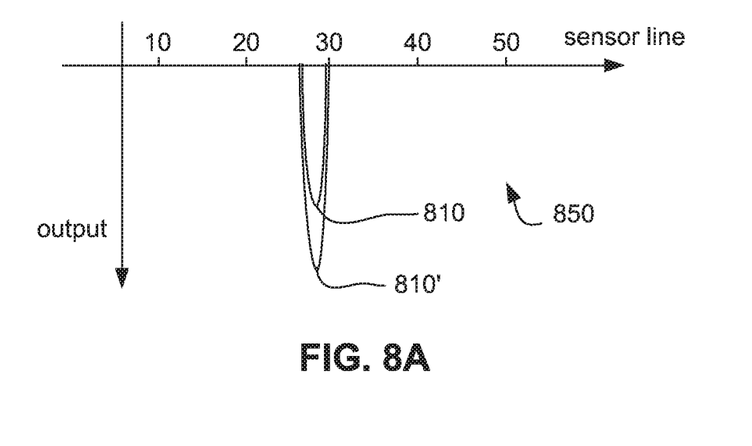
FIGS. 8A and 8B are a simplified schematic graphs of exemplary pressure sensitive output detected with two exemplary pressure sensitive sensors in accordance with some embodiments of the present disclosure.
Figure 8B:
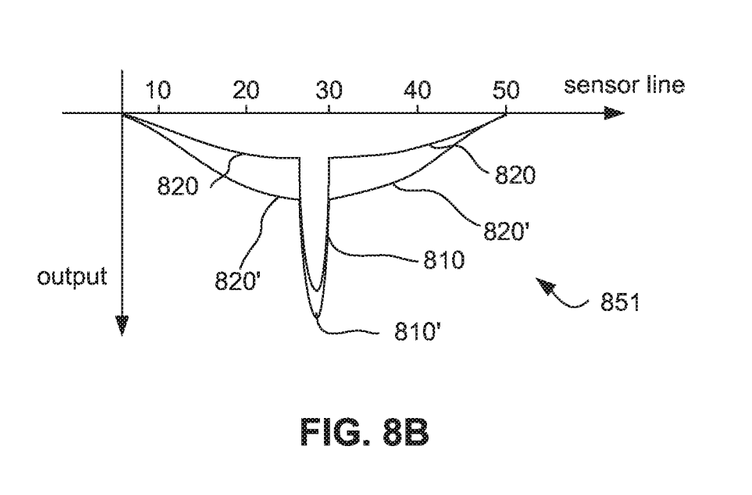

Reference is now made to FIGS. 8A and 8B showing are a simplified schematic graphs of exemplary pressure sensitive output detected with two exemplary pressure sensitive sensors in accordance with some embodiments of the present disclosure. According to some exemplary embodiments of the present disclosure, graph 850 represents exemplary output obtained from sensor 51, sensor 52 and/or sensor 56. to According to some embodiments of the present invention, a presence of finger 46 on the sensor without applying pressure results in a sharp peak at a location of interaction. Typically, a width of the peak is substantially defined by a width of fingertip 46. According to some embodiments of the present disclosure, height of peak 808 increases, e.g. to height of peak 808' as fingertip 46 applies pressure on the sensor. According to some embodiments of the present disclosure, coordinates of fingertip 46 are detected from location of peak 808 and pressure applied by fingertip 46 is detected based on amplitude of peak 808. Optionally, a detected height of peak 808 when no pressure is applied is pre-determined and compared to detected height for determining applied pressure.

According to some exemplary embodiments of the present disclosure, graph 851 represents exemplary output obtained from sensor 53. According to some embodiments of the present disclosure, the capacitive affect due to the presence of finger 46 results in sharp peak 810 at the location of touch and the capacitive affect due to applied pressure results is a wider more spread out dome 820 that occurs due to bowing of sensor layer 150 in response to applied pressure. According to some embodiments of the present disclosure, a height of dome 820 increases with increasing pressure. Dome 820' represents output when fingertip 46 presses against sensor 53 with more pressure as compared dome 820. Typically, height of peak 810 also increases with increase in pressure. Peak 810' represents output when fingertip 46 presses against sensor 53 with more pressure as compared to peak 810. According to some exemplary embodiments of the present disclosure, pressure detection is based on height of dome 820 and coordinate detecting is based on location of peak 810.

In graph 850 and graph 851, the coupled signal due to fingertip 46 decreases since the fingertip is grounded and drains the coupled signal. In some exemplary embodiments, for example when a token is used for interaction, the coupled signal increases, e.g. the peak is in the positive direction. Graph 850 and graph 851 show profiles in one of the row or column directions. Typically a substantially same profile is obtained in the other of the row or column direction for symmetric objects. Typically, shape of peak 810 depends on shape of interacting object.

Figure 9:
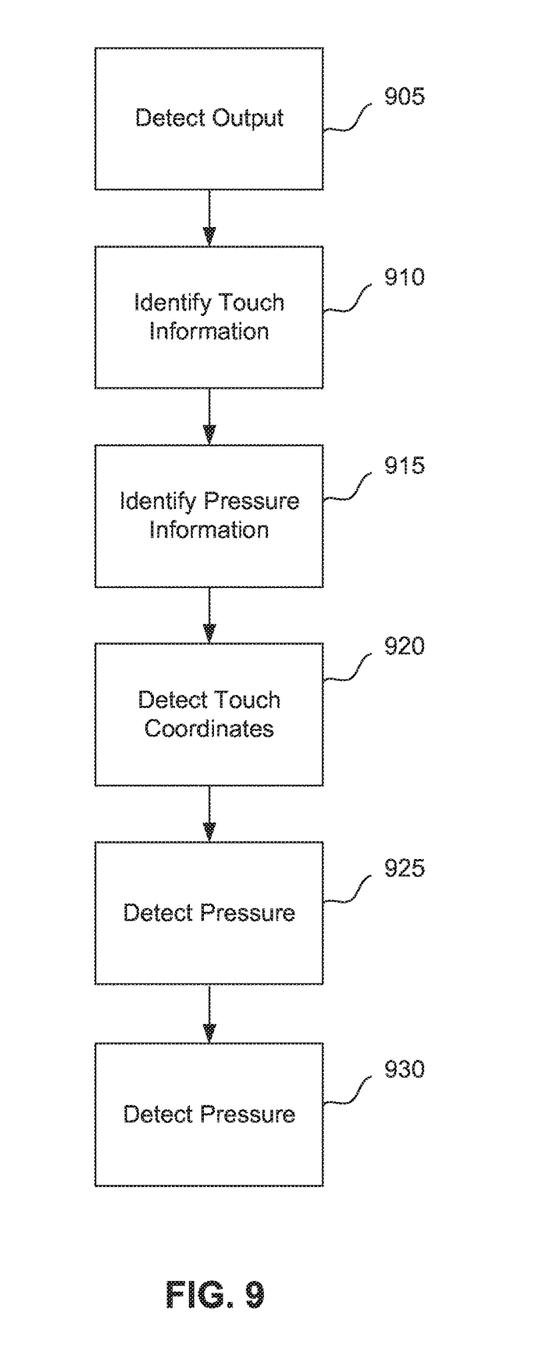
FIG. 9 is a simplified flow chart of an exemplary method for detecting interaction coordinates and pressure applied during interaction in accordance with some embodiments of the present disclosure.

Reference is now made to FIG. 9 showing a simplified flow chart of an exemplary method for detecting interaction coordinates and pressure applied during to interaction in accordance with some embodiments of the present disclosure. According to some embodiments of the present disclosure, capacitive detection is applied to detect output from a pressure sensitive capacitive sensor as described herein (block 905). According to some embodiments of the present disclosure, output providing information regarding interaction location is identified (block 910). In some exemplary embodiments, output obtained due to capacitive coupling between the interacting object and capacitive sensor is detected and/or differentiated from output obtained due to bending and/or pressing against the capacitive sensor. Alternatively and/or some other embodiments, no differentiating is made between output resulting from applied pressure and output resulting from capacitive coupling due to a presence of the interacting object.

According to some embodiments of the present disclosure, output providing information related to pressure applied by the interacting object is identified (block 915). Typically, amplitude of output is related to pressure applied by an interacting object. According to some embodiments of the present disclosure, coordinates of touch interaction is detected based on one or more of touch and pressure information (block 920). According to some embodiments of the present disclosure, pressure applied during interaction is detected (block 925). According to some embodiments of the present disclosure, at least one of location and/or pressure is reported to a host computer (block 930).

Although most of the embodiments of the present disclosure has been described in reference to a fingertip interacting with a capacitive based sensor, it is understood that fingertip interaction is only exemplary and that the capacitive sensors described herein are also operative to detect interaction with other objects.

An aspect of some embodiments of the present disclosure provides for a sensor including: a sensor layer patterned with conductive elements spread across the sensor layer, wherein the conductive elements are electrically isolated from one another and wherein the sensor layer is configured for capacitive based sensing; and a resilient layer proximate to the sensor layer, the sensor layer configured to detect local compressions based on pressure applied to the resilient layer.

Optionally, the resilient layer is configured to compress differentially in response to differential pressure.

Optionally, the resilient layer is 50-500 µm thick.

Optionally, the resilient layer is formed with spacer dots.

Optionally, the resilient layer is coated with conductive material.

Optionally, the conductive material is coated on a surface of the resilient layer that faces away from the sensor layer.

Optionally, the sensor layer is formed from a rigid substrate patterned with conductive elements.

Optionally, the sensor layer is 0.1-1 mm thick.

Optionally, the sensor layer is pressure sensitive.

An aspect of some embodiments of the present disclosure provides for a sensor including: a sensor layer formed with flexible substrate and patterned with conductive elements spread across the sensor layer, wherein the conductive elements are electrically isolated from one another and wherein the sensor layer is configured for capacitive based sensing; and an array of spacer dots proximate to the sensor layer and providing a surface over which the sensor layer is mounted.

Optionally, the spacer dots are configured to compress differentially in response to differential pressure.

Optionally, the diameter of spacer dots is 20-200 µm.

Optionally, the sensor layer is operative to bend at an interaction location in response to pressure applied by an object interacting with the sensor.

An aspect of some embodiments of the present disclosure provides for a sensor including: a sensor layer formed with a rigid substrate and patterned with conductive elements spread across the sensor layer, wherein the conductive elements are electrically isolated from one another and wherein the sensor layer is configured for capacitive based sensing; and a spacer positioned along a perimeter of the sensor layer, the spacer configured for mounting the sensor layer over a display at a pre-defined height above the display with an air gap layer formed therebetween.

Optionally, the sensor layer is configured to bow based on pressure applied by an object interacting with the sensor.

Optionally, a volume of air in the air gap is removed based bowing of the sensor.

Optionally, the sensor layer is configured to bow differentially in response to differential pressure applied by an object interacting with the sensor.

Optionally, the sensor layer is 0.3-0.1 mm thick.

Optionally, the sensor layer is pressure sensitive.

An aspect of some embodiments of the present disclosure provides for a sensor including: a sensor layer patterned with conductive elements spread across the sensor layer, wherein the conductive elements are electrically isolated from one another and wherein the sensor is configured for capacitive based sensing; and a cover layer formed with a rigid material that is operative to cover the sensor layer and provide a surface over which a user interacts with the sensor; a spacer positioned along a perimeter of the cover layer, the spacer configured for mounting the cover layer over at a pre-defined height above the sensor layer with an air gap layer formed therebetween.

Optionally, the sensor layer is formed with a rigid material.

Optionally, the sensor layer is 0.3-0.1 mm thick.

Optionally, the cover layer is 0.3-0.1 mm thick.

An aspect of some embodiments of the present disclosure provides for a sensor including: a sensor layer including a first sub-layer patterned with a first array of conductive elements and a second sub-layer patterned with a second array of conductive elements, both spread across the sensor layer, wherein the conductive elements are electrically isolated from one another and wherein the sensor is configured for capacitive based sensing; and an array of spacer dots separating the first sub-layer from the second sub-layer, wherein the spacer dots are configured to be compressed based on pressure applied by an object interacting with the sensor.

Optionally, the first sub-layer is configured to touch the second sub-layer at an interaction location based on a pre-defined pressure applied on the sensor by the object interacting with the sensor.

Optionally, the conductive elements are patterned in a grid.

Optionally, the sensor is configured to detect an object interacting while water is present on the surface over which the user interacts with the sensor.

Optionally, the sensor is configured to detect an object that is not conductive.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as to suitable in any other described embodiment of the disclosure. Certain features described in the context of various embodiments are not to be considered essential features of those embodiments, unless the embodiment is inoperative without those elements.

What is claimed is:

1. A sensor comprising:
    a sensor layer patterned with conductive elements spread across the sensor layer, wherein the conductive elements are electrically isolated from one another and wherein the sensor layer is configured for capacitive based sensing; and
    a resilient layer formed with spacer dots coated with a hard coat film and positioned proximate to the sensor layer, the sensor layer configured to detect local changes in capacitance based on pressure applied to the resilient layer,
    wherein the spacer dots are formed from a material having a hardness of between 20-40 durometers.

2. The sensor of claim 1, wherein the resilient layer is configured to compress differentially in response to differential pressure.

3. The sensor of claim 1, wherein the resilient layer is 50-500 µm thick.

4. The sensor of claim 1, wherein the resilient layer is coated with conductive material.

5. The sensor of claim 4, wherein the conductive material is coated on a surface of the resilient layer that faces away from the sensor layer.

6. The sensor of claim 1, wherein the sensor layer is formed from a rigid substrate patterned with conductive elements.

7. The sensor of claim 1, wherein the sensor layer is 0.1-1 mm thick.

8. The sensor of claim 1, wherein the sensor layer is pressure sensitive.

9. The sensor of claim 1, wherein the conductive elements are patterned in a grid.

10. The sensor of claim 1, wherein the sensor is configured to detect an object interacting while water is present on the surface over which the user interacts with the sensor.

11. The sensor of claim 1, wherein the sensor is configured to detect an object that is not conductive.

12. The sensor of claim 1 wherein the hard coat film is an interacting surface of the sensor.

13. The sensor of claim 1, wherein an air gap is established between the sensor layer and a display, or between the sensor layer and a protective cover, and wherein a volume of air in the air gap is removed based on bowing of the sensor.

14. A sensor comprising:
    a sensor layer formed with flexible substrate and patterned with conductive elements spread across the sensor layer, wherein the conductive elements are electrically isolated from one another and wherein the sensor layer is configured for capacitive based sensing;
    an array of spacer dots coated with a hard coat film proximate to the sensor layer and providing a surface over which the sensor layer is mounted, wherein the spacer dots are configured to compress differentially in response to differential pressure, wherein the spacer dots are formed from a material having a hardness of between 20-40 durometers; and
    a circuit configured to detect local changes in capacitance between the conductive elements based on compression of the spacer dots in the array.

15. The sensor of claim 14, wherein the diameter of spacer dots is 20-200 μm.

16. The sensor of claim 14, wherein the sensor layer is operative to bend at an interaction location in response to pressure applied by an object interacting with the sensor.

17. The sensor of claim 14, wherein the conductive elements are patterned in a grid.

18. The sensor of claim 14, wherein the sensor is configured to detect an object interacting while water is present on the surface over which the user interacts with the sensor.

19. A sensor comprising:
a sensor layer including a first sub-layer patterned with a first array of conductive elements and a second sub-layer patterned with a second array of conductive elements, both spread across the sensor layer, wherein the conductive elements are electrically isolated from one another and wherein the sensor is configured for capacitive based sensing; and
an array of spacer dots separating the first sub-layer from the second sub-layer, wherein the spacer dots are coated with a hard coat film and are configured to be compressed based on pressure applied by an object interacting with the sensor, wherein the spacer dots are formed from a material having a hardness of between 20-40 durometers.

20. The sensor of claim 19, wherein the first sub-layer is configured to make conductive contact with the second sub-layer at an interaction location based on a pre-defined pressure applied on the sensor by the object interacting with the sensor.

21. The sensor of claim 19, wherein the sensor is configured to detect an object interacting while water is present on the surface over which the user interacts with the sensor.

* * * * *